US007739422B2

(12) United States Patent
Hua et al.

(10) Patent No.: US 7,739,422 B2
(45) Date of Patent: Jun. 15, 2010

(54) METHOD TO IMPROVE SYSTEM DMA MAPPING WHILE SUBSTANTIALLY REDUCING MEMORY FRAGMENTATION

(75) Inventors: Binh Hua, Austin, TX (US); Hong L. Hua, Austin, TX (US); Dirk Michel, Austin, TX (US); Wen Xiong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/385,926

(22) Filed: Mar. 21, 2006

(65) Prior Publication Data

US 2007/0245041 A1 Oct. 18, 2007

(51) Int. Cl.
*G06F 13/28* (2006.01)
(52) U.S. Cl. ...................................................... 710/22
(58) Field of Classification Search .................. 710/22; 395/309
See application file for complete search history.

(56) References Cited

U.S. PATENT DOCUMENTS

| | | | | |
|---|---|---|---|---|
| 5,815,678 A | * | 9/1998 | Hoffman et al. | 710/305 |
| 5,991,520 A | * | 11/1999 | Smyers et al. | 710/100 |
| 6,128,713 A | * | 10/2000 | Eisler et al. | 711/159 |
| 6,243,783 B1 | * | 6/2001 | Smyers et al. | 710/310 |
| 6,629,162 B1 | * | 9/2003 | Arndt et al. | 710/28 |
| 6,662,242 B2 | | 12/2003 | Holm et al. | |
| 6,704,808 B2 | * | 3/2004 | Kasamatsu et al. | 710/2 |

OTHER PUBLICATIONS

Hua et al., Method for Minimizing the Translation Overhead for Large I/O Transfers, U.S. Appl. No. 10/965,633, filed Oct. 14, 2004.
Tago, High Performance DMA, IBM Technical Disclosure Bulletin, v36, n11, Nov. 1993, pp. 139-140.
Lyons, Resource Management for Non-Micro Channel DMA Masters, IBM Technical Disclosure Bulletin, v38, n10, Oct. 1995, pp. 537-540.

* cited by examiner

*Primary Examiner*—Henry W. H. Tsai
*Assistant Examiner*—Titus Wong
(74) *Attorney, Agent, or Firm*—Dillon & Yudell, LLP

(57) ABSTRACT

A method, system and computer program product for eliminating the latency in searching for contiguous memory space by an IO DMA request of a device driver. Three new application programming interfaces (APIs) are provided within the operating system (OS) code that allows the device driver (s) to (1) pre-request and pre-allocate the IO DMA address range from the OS during the IPL and maintain control of the address, (2) map a system (virtual/physical) address range to a specific pre-allocated IO DMA address range, and (3) free the pre-allocated IO DMA address space back to the kernel when the space is no longer required. Utilizing these APIs enables advanced IO DMA address mapping techniques maintained by the device drivers, and the assigned/allocated IO DMA address space is no longer fragmented, and the latency of completing the IO DMA mapping is substantially reduced/eliminated.

6 Claims, 3 Drawing Sheets

METHOD TO IMPROVE SYSTEM DMA MAPPING WHILE SUBSTANTIALLY REDUCING MEMORY FRAGMENTATION

BACKGROUND OF THE INVENTION

1. Technical Field

The present invention relates generally to computer systems and in particular to memory allocation in a computer system. Still more particularly, the present invention relates to a method, system and computer program product for proving improved DMA mapping.

2. Description of the Related Art

Computer systems comprise a limited physical memory resource that is dynamically allocated to executing applications and input/output (IO) devices (or associated adapters) on request. Memory is accessed via a virtual address translated into a real (or physical) address that corresponds to the physical location within the memory. One method of completing these allocations and/or accesses to memory address space is via a direct memory access (DMA) operation issued from an IO adapter.

In many of today's computer systems, the system's physical memory address space is typically greater than the IO address space. With these computer systems, in order for the IO adapter(s) to access the entire system physical memory, some translation mechanisms is required. For example, a 32 bit IO address subsystem requires some kind of memory mapping to allow the IO adapter to access system memory addresses that are greater than 4 GB. Currently, most Operating Systems (OSes) set the maximum page size (in memory) to 4 Kbytes (4K), and thus each mapping page is 4 Kbytes. Table 1 below illustrates an example of an address mapping table, which shows the translation between system memory address and IO DMA (direct memory access) address for a given 4K page base address.

TABLE I

| System Memory Address | IO DMA address |
|---|---|
| 9000000E 00120000 | F1000000 |
| 9000000E 00221000 | F1001000 |
| . | . |
| . | . |
| . | . |
| 9000000E 01010000 | F10AF000 |
| 9000000E 21002100 | F11B0000 |
| . | . |
| . | . |
| . | . |

To satisfy new requirements of high performance IO adapters, the data buffer mapping size needs to be greater than 4 Kbytes, particularly to take advantage of Ethernet jumbo frame and large TCP segmentation offload (TSO) send, for example. To enable support of this larger data buffer mapping size, the developers of the OSes have improved the OS' mapping methods to allow the address mapping of more than 4 Kbytes of continuous IO DMA address.

FIG. 1 is a flow chart illustrating the prior art methods by which the device driver maps a system physical address to an IO DMA address. The illustrated method describes the AIX OS function. However, the presented flow chart is provided as one example and may apply to other OSes as well.

As shown, the process begins at block 102 at which the computer system (or IO adapter) is initialized. During initializing of the IO adapter, the device driver makes a system call to register the size of the IO address space the driver needs for the operation, as shown at block 104. D_MAP_INIT is an example of this system call. Following, at block 106, the device driver calls the memory allocation routine to allocate system memory (buffer). Then, the device driver calls the system mapping routine to map the system memory to an IO DMA address at block 108. An example of this system call is D_MAP_PAGE/D_MAP_LIST.

Once this call is made, the device driver monitors when the IO DMA address is no longer needed, as indicated at decision block 110. If the IO DMA address is still needed, then the adapter maintains the space, as shown at block 116. However, when the IO DMA address is no longer needed, the device driver calls the kernel unmap routines to return the IO DMA address back to the kernel, as shown at block 112. Then, the device driver/OS frees the allocated memory back to the kernel, as provided at block 114. Examples of these system calls that complete the return of the allocated memory back to the kernel are D_UNMAP_PAGE/D_UNMAP_LIST and D_MAP_CLEAR.

As more and more adapters request memory address space, over time, the IO DMA address space becomes more and more fragmented. When this fragmentation surpasses a threshold point, as multiple portions of the large IO DMA space are assigned to DMA requests, the contiguity of available space decreases, and contiguous space becomes more difficult to find for assigning to new DMA requests.

Additionally, as the level of fragmentation increases, the latency in obtaining an assignment of an IO DMA address (for a contiguous address space) from the OS increases as well. This increase latency may cause measurable delays in processing and thus have a substantial negative impact on the overall system performance. While these delays are very common in the operation of most computer systems today, they are not desirable. Thus, a system that initially performs DMA address allocations at a relatively fast speed, eventually loses substantial performance speed (i.e., requires increased latency) after a period of operation. These systems thus do not perform as well as when the system initially starts up.

As described with the above and other types of conventional DMA mapping (e.g., using application programming interfaces (APIs)), several limitations exist. Among these limitations are the following: (1) while the driver is able to pre-register the size of the I/O DMA address the driver needs during the IPL time, the pre-registration does not guarantee address mapping operation success all the time. That is, the mapping may fail if the memory space runs out of the amount of continuous address space that is requested by the driver; and (2) the longer the system up time, the more fragmented the IO DMA address space will become and the longer the time required (i.e., latency of operation) to obtain a large contiguous address space for an IO DMA mapping. As noted above, this increased latency negatively impacts the overall system performance.

SUMMARY OF THE INVENTION

Disclosed is a method, system and computer program product for increasing the efficiency of IO DMA operations in a computer system by eliminating the latency in searching for contiguous memory space by an IO DMA request of a device driver when the search occurs sometime after the initial program loader (IPL). Three new application programming interfaces (APIs) are provided within the operating system (OS) code that allows the device driver(s) to (1) pre-request and pre-allocate the IO DMA address range from the OS during the IPL and maintain control of the address, (2) map a system (virtual/physical) address range to a specific pre-allocated IO DMA address range, and (3) free the pre-allocated IO DMA address space back to the kernel when the space is no longer required. Utilizing these APIs enables advanced IO DMA address mapping techniques maintained by the device drivers, and the assigned/allocated IO DMA address space is no longer fragmented, and the latency of completing the IO DMA mapping is substantially reduced/eliminated.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, system and computer program product for increasing the efficiency of IO DMA operations in a computer system by eliminating the latency in searching for contiguous memory space by an IO DMA request of a device driver when the search occurs sometime after the initial program loader (IPL). Three new application programming interfaces (APIs) are provided within the operating system (OS) code that allows the device driver(s) to (1) pre-request and pre-allocate the IO DMA address range from the OS during the IPL and maintain control of the address, (2) map a system (virtual/physical) address range to a specific pre-allocated IO DMA address range, and (3) free the pre-allocated IO DMA address space back to the kernel when the space is no longer required. Utilizing these APIs enables advanced IO DMA address mapping techniques maintained by the device drivers, and the assigned/allocated IO DMA address space is no longer fragmented, and the latency of completing the IO DMA mapping is substantially reduced/eliminated.

Figure 1:
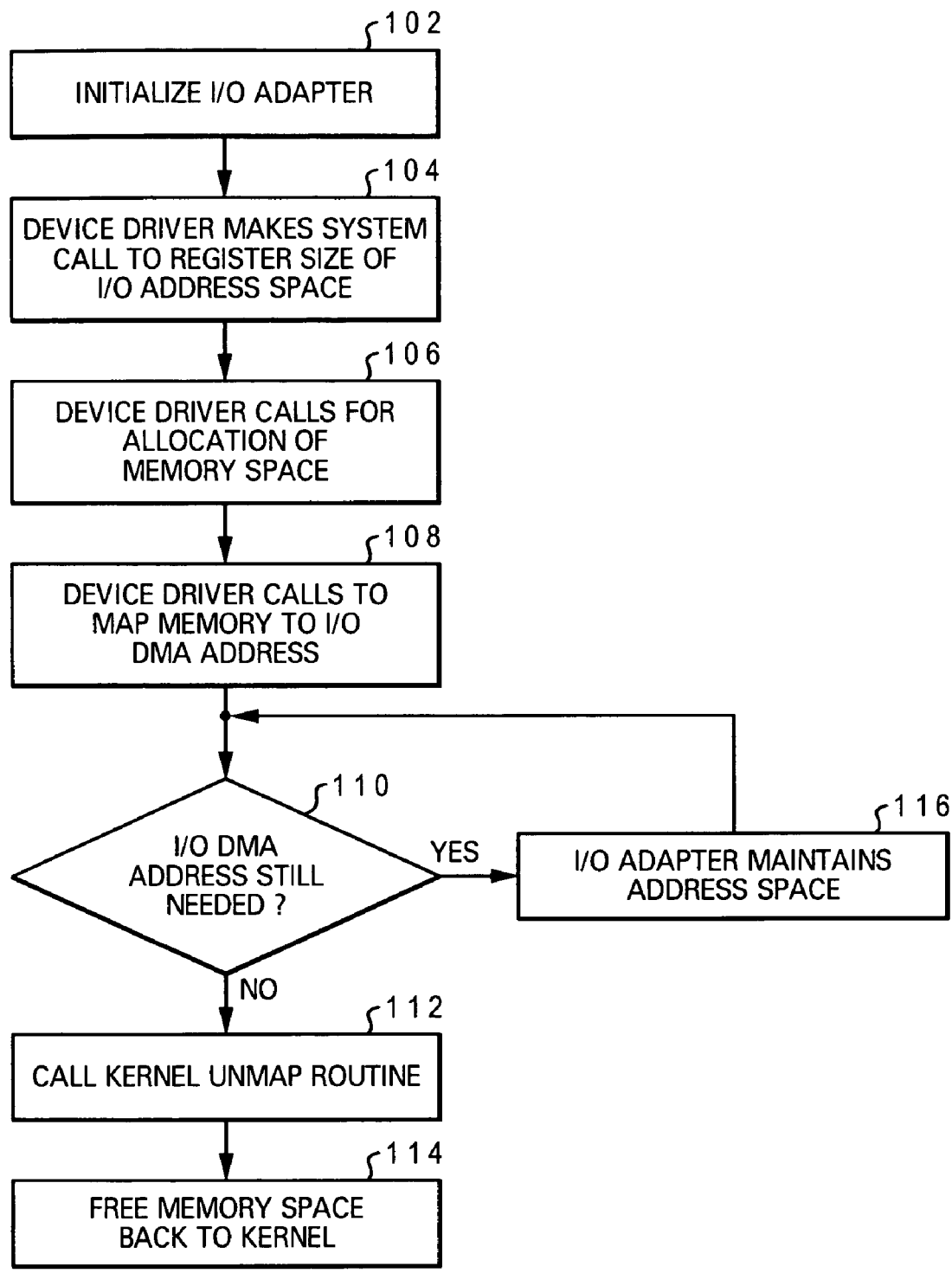
FIG. 1 a flow chart of the process of allocating DMA address space according to the prior art.
Figure 2:
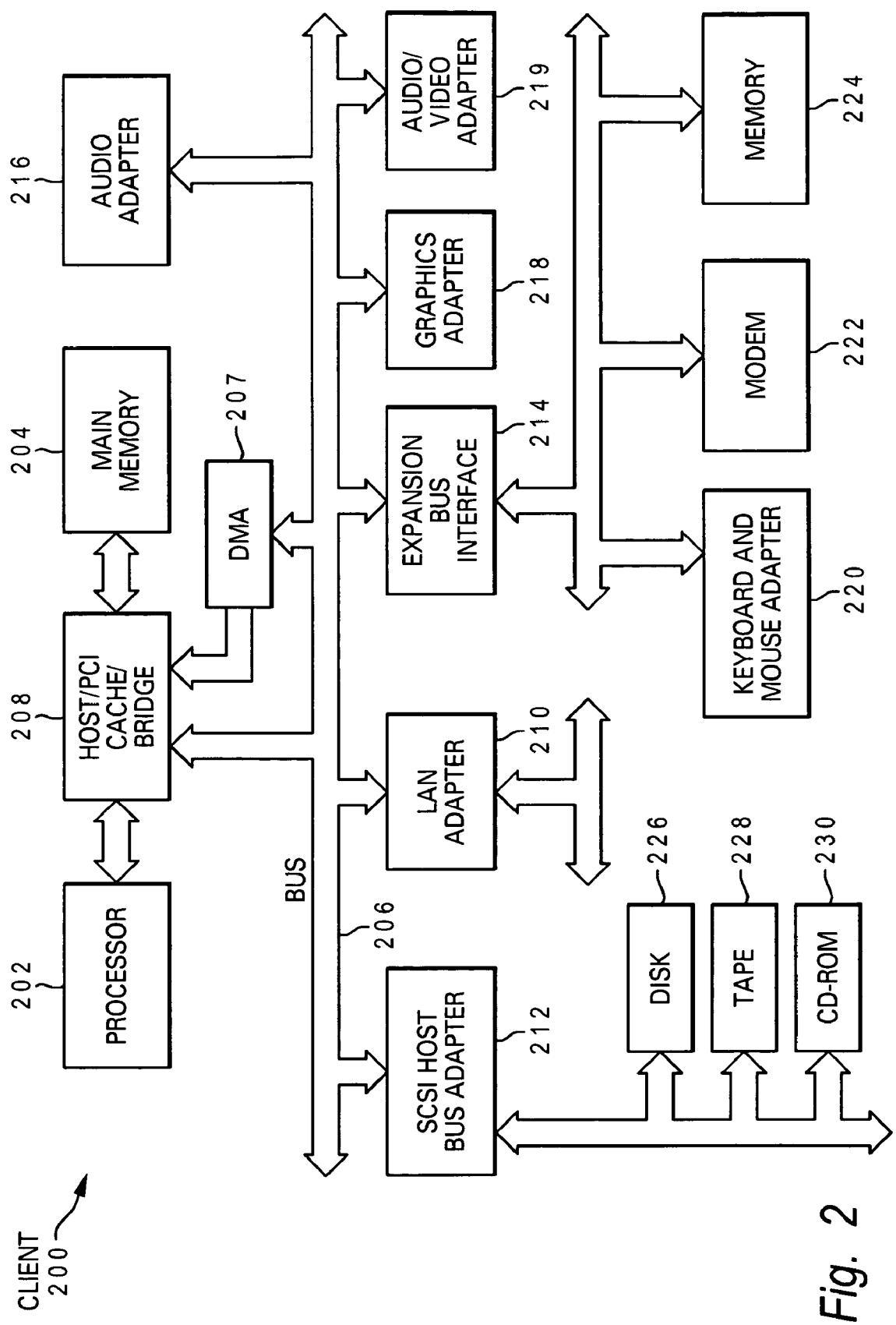
FIG. 2 is a block diagram illustrating a data processing system in which the present invention may be implemented in accordance with a preferred embodiment of the present invention.

With reference now to FIG. 2, a block diagram of a data processing system is shown in which the present invention may be implemented. Data processing system 200 is an example of a computer in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system (OS) runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202. The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as network adapter 210, modem 222, or the like.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Additional devices may also be provided for accessing memory 224, for example a Direct Memory Access (DMA) controller 207. DMA controller 207 is shown connected to system bus 206; However it is understood that DMA controller (or perhaps a second DMA controller) may be connected to an external bus, which connects to other IO master devices, such as a digital signal processor (DSP). DMA controller 207 accesses memory utilizing standard page frame tables and the like, according to established memory access techniques.

The features of the present invention are implemented in a data processing system such as the data processing system 200 of FIG. 2. The described embodiment of the invention provides a new set of application programming interfaces (APIs) that allow the IO adapter device driver to maintain its own IO DMA address mapping. Implementation of these new APIs enables avoidance of the IO DMA address fragmentation and also reduces the CPU cycles required (i.e., the latency) to perform the address mapping. Thus, these new APIs measurably improve the system's performance.

According to one embodiment, the new APIs are implemented as commands having formats provided below. These commands and their respective descriptions or definitions of the parameters utilized, include:

(API_1) IO address=IO DMA_ADDRESS REQUEST (size), where "IO address" is a return value that is the beginning of IO DMA address space which the kernel (OS) has assigned to the caller, and "size" is the size of contiguous address space requested by the caller;

(API_2) VIRT_TO_DMA_MAPPING (virt, DMA, size), where "Virt" is the virtual memory address needed to be mapped to IO DMA address space, "DMA" is the DMA address that the driver requests the kernel map to the virtual address, and "Size" is again the size of the mapping; and (API_3) IO_DMA_ADDRESS_FREE (IO address, size), where IO address is the beginning of the IO DMA address which the driver wishes to free back to the kernel and "size" is the size of continuous address space that the caller wishes to give back to the kernel, which may be re-allocated to a later address request.

Figure 3:
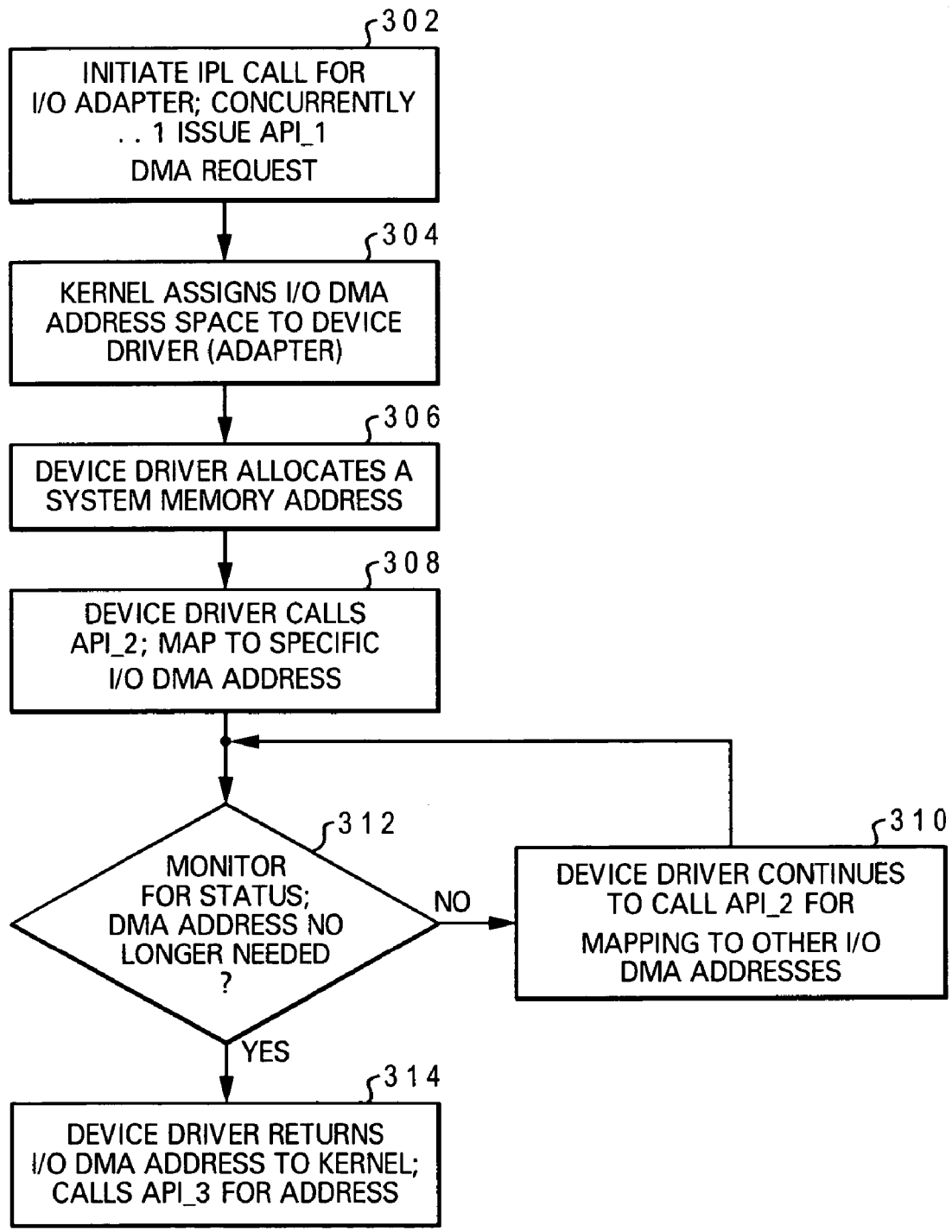
FIG. 3 is a flow chart of the process of allocating DMA address space utilizing APIs according to one embodiment of the invention.

With these new APIs, the device driver is able to provide several advanced functions, which functions are illustrated by the process illustrated within the flow chart of FIG. 3, described below. The specific addresses (numbers) and/or sizes described herein are provided merely for illustration and not meant to imply any limitations on the invention. The process begins at block 302, which shows the initiation of a DMA address request during the IPL call of the IO adapter. As an example, the following device driver call (API_1) is made:

IO_address=IO_DMA_ADDRESS_REQUEST (0x100000).

According to the invention, the above API call occurs during adapter IPL time. After the API call, the IO address of that adapter receives a value of 0xF0001000. The kernel further assigns the IO_DMA address space 0xE0001000 to 0xF0101000 to the device driver, as shown at block 304. During run time, the device driver allocates a system memory (virtual address) as shown at block 306, and at block 308, the device driver calls the new API (API_2) to map to the specific IO DMA address which the driver requested during IPL time and which address is maintained by the driver. This function is provided by an API_2 call, such as:

VIRT_TO_DMA_MAPPING (0x56780000, 0xF0001000, 0x4000)

With this call, the driver requests the kernel to map the system memory from 0x56780000 . . . 0x56784000 to the IO DMA address space 0xF0001000 . . . 0xF0005000.

As shown at block 310, the device driver is able to request any number of other mappings using an API_2 call, such as:

VIRT_TO_DMA_MAPPING (0x77780000, 0xF0005000, 0x1000)

With this call, the driver requests the kernel to map the system memory from 0x77780000 . . . 0x77781000 to IO DMA address space 0xF0005000 . . . 0xF0006000.

Finally, the driver monitors at block 312 for an indication of when the pre-allocated the IO DMA address is no longer needed. Following this determination at block 312, the driver returns the IO DMA address to the kernel as shown at block 314. In one embodiment, the return of the IO DMA address occurs only when the driver is going to close the device. This process may (for example) involve the API_3 function call of:

IO_DMA_ADDRESS_FREE (0XF0001000, 0x100000)

With this call, the device driver releases the IO DMA address space 0xF0001000 . . . 0xF0101000 to the kernel.

With the above described new APIs, the device driver is able to maintain the IO DMA address space from the IPL rather than being made to incur the latency of attempting to find contiguous address space when the space is later requested/needed. The invention guarantees the contiguous size of IO DMA address space will always be available for the adapter to later utilize, when the adapter wishes to utilize the contiguous space. Further, the invention enables the kernel to substantially eliminate the need to search for free IO DMA address space within a fragmented memory space. The mapping of IO DMA address is provided by the device driver rather than the kernel. Finally, the invention enables the reduction of the number of CPU cycles (latency) needed to map the IO DMA address space, and helps to prevent IO DMA address fragmentation in the kernel.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
a memory comprising physical address space;
a Direct Memory Access (DMA) controller;
an operating system (OS) kernel that controls access to the memory and communicates with the DMA controller to complete virtual-to-real memory access;
a device driver associated with the OS kernel, said device driver comprising logic which:
implements application programming interfaces (APIs) that enable the device driver to allocate a specific, contiguous Input/Output (IO) DMA address space to an adapter/IO device during initial program launch (IPL), wherein the allocated contiguous IO DMA address space is later utilized to perform DMA mapping operations associated with that IO device, without incurring the latency of a search for contiguous DMA address space when the DMA address space is later required by the IO device; and
issues, during the IPL of the adapter/IO device, a first API call with a first API command to reserve a contiguous IO DMA address space for the adapter/IO device, wherein said first API call includes a size of the contiguous IS DMA address space requested; and calling a second API to map virtual memory address space to the contiguous IO DMA address space requested by the device driver during the IPL, wherein the start IO DMA address and size of the contiguous IO DMA address space are maintained by the device driver;

wherein the APIs comprise:

a first API, implemented as a first command comprising a request for allocation of a specific IO DMA address space including a start IO DMA address and a desired size of the contiguous DMA address space required for a later DMA mapping, wherein issuance of the first API triggers the kernel to assign the specific IO DMA address space to the IO device;

a second API, also implemented as a second command that triggers the mapping of a virtual address space to the previously-allocated IO DMA address space when the IO device later requires said later DMA mapping; and a third API implemented as a third command that releases the allocated IO DMA address space back to the OS kernel, wherein said IO DMA address space may then be allocated to another contiguous IO device undergoing an IPL; and wherein said APIs: (a) enable the device driver of the adapter/IO device to perform its own IO DMA address mapping; and (b) enable substantial reduction of IO DMA address fragmentation and reduces latency for performing DMA address mapping requiring contiguous IO DMA address space.

2. The data processing system of claim 1, wherein said OS kernel comprises functional code which:

on receipt of a first API call during IPL of the adapter, assigns, to the adapter, a contiguous IO DMA address space of a requested size with a specific start IO contiguous IO DMA address;

subsequently blocks overlapping assignment of the assigned contiguous IO DMA address space to another adapter undergoing IPL while the adapter is assigned the contiguous IO DMA address space;

on receipt of a later request from a device driver of the adapter to map a virtual address space of the system memory to the assigned contiguous IO DMA address space, automatically mapps the contiguous IO DMA address space to the virtual address space provided without initiating a search for other contiguous IO DMA address space to complete the DMA mapping; and on receipt of a request to de-allocate the address space:

monitors to detect when the device driver closes the driver logic; and de-allocates the contiguous IO DMA address space when the IO device is being closed by the device driver; and returns the contiguous IO DMA address space to the kernel, wherein a later allocation to another adapter may be completed during IPL of the another adapter.

3. In a data processing system, a method comprising:

during an initial program launch (IPL) of an adapter of a device, dynamically triggering the pre-allocation of a contiguous input/output (10) direct memory access (DMA) address space to the device via a first application programming interface (API) provided by a device driver logic;

subsequently maintaining the pre-allocated contiguous IO DMA address space for that device;

when the device later requires a contiguous IO DMA mapping, automatically mapping, via a second API, a virtual address space of a memory of the data processing system to the pre-allocated DMA address space;

on receipt of a first API call during IPL of an adapter, assigning, to the adapter, a contiguous IO DMA address space of a requested size with a specific start IO DMA address;

subsequently blocking overlapping assignment of the assigned contiguous IO DMA address space to another adapter undergoing IPL while the adapter is assigned the contiguous IO DMA address space;

on receipt of a later request from a device driver of the adapter to map a virtual address space of the memory to the assigned DMA address space, automatically mapping the contiguous IO DMA address space to the virtual address space provided without initiating a search for other contiguous IO DMA address space to complete the DMA mapping;

monitoring to detect when the device driver closes the driver logic;

de-allocating the contiguous IO DMA address space when the device is being closed by the device drive;

on receipt of a request to de-allocate the contiguous IO DMA address space, returning the contiguous IO DMA address and address space to the kernel, wherein a later allocation to another adapter may be completed during IPL of the another adapter;

wherein the first API is implemented as a first command comprising a request which allocates a specific IO DMA address space, including a start IO DMA address and a desired size of the contiguous IO DMA address space required for a later DMA mapping, wherein issuance of the first API triggers the kernel to assign the specific IO DMA address space to the contiguous device;

wherein the second API is implemented as a second command that triggers the mapping of a virtual address space to the pre-allocated contiguous IO DMA address space when the device later requires said later DMA mapping;

wherein a third API implemented as a third command that releases the allocated contiguous IO DMA address space back to the OS kernel, wherein said IO DMA address space may then be allocated to another IO device undergoing an IPL;

wherein said APIs enable the device driver logic of the adapter of the device to perform its own IO DMA address mapping; and wherein said APIs enable substantial reduction of IO DMA address fragmentation and reduces latency for performing DMA address mapping requiring contiguous IO DMA address space.

4. The method of claim 3, wherein said dynamically triggering further comprises:

issuing, during the IPL of the adapter of the device, a first API call with the first API command to reserve a contiguous IO DMA address space for the device, wherein said first API call includes a size of the address space requested; and calling a second API to map virtual memory address space to the contiguous IO DMA address space requested by the device driver logic during the IPL, wherein a start IO DMA address and size of the contiguous IO DMA address space are maintained by the device driver logic.

5. A computer program product comprising:

a computer readable medium; and program code on the computer readable medium for:

during an initial program launch (IPL) of an adapter of a device, dynamically triggering the pre-allocation of a contiguous input/output (10) direct memory access (DMA) address space to the device via a first application programming interface (API) provided by device driver logic;

subsequently maintaining the pre-allocated contiguous IO DMA address space for that device; and when the device later requires a contiguous IO DMA mapping, automatically mapping, via a second API, a virtual address space of a memory of the data processing system to the pre-allocated DMA address space;

on receipt of a first API call during IPL of an adapter, assigning, to the adapter, a contiguous IO DMA address space of a requested size with a specific start IO DMA address;

subsequently blocking overlapping assignment of the assigned contiguous IO DMA address space to another adapter undergoing IPL while the adapter is assigned the contiguous IO DMA address space;

on receipt of a later request from a device driver of the adapter to map a virtual address space of the memory to the assigned contiguous IO DMA address space, automatically mapping the contiguous IO DMA address space to the virtual address space provided without initiating a search for other contiguous IO DMA address space to complete the DMA mapping;

monitoring to detect when the device driver closes the driver logic;

de-allocating the contiguous IO DMA address space when the contiguous IO device is being closed by the device driver;

on receipt of a request to de-allocate the contiguous IO DMA address space, returning the IO DMA address space to the kernel, wherein a later allocation to another adapter may be completed during IPL of the another adapter;

wherein the first API is implemented as a first command comprising a request for allocation of a specific IO DMA address space including a start IO DMA address and a desired size of the contiguous DMA address space required for a later DMA mapping, wherein issuance of the first API triggers the kernel to assign the specific IO DMA address space to the device;

wherein the second API is implemented as a second command that triggers the mapping of a virtual address space to the pre-allocated contiguous IO DMA address space when the device later requires said later DMA mapping; and wherein a third API is implemented as a third command that releases the allocated IO DMA address space back to the kernel, wherein said contiguous IO DMA address space may then be allocated to another IO device undergoing an IPL.

6. The computer program product of claim 5, wherein said code for dynamically triggering further comprises code for:

issuing, during the IPL of the adapter/IO device, a first API call with a first API command to reserve a contiguous IO DMA address space for the device, wherein said first API call includes a size of the continuous IO DMA address space requested;

calling a second API to map virtual memory address space to the contiguous IO DMA address space requested by the driver during the IPL, wherein a start IO DMA address and size of the DMA address space are maintained by the device driver logic;

wherein said APIs enable the device driver logic of the adapter of the device to perform its own IO DMA address mapping; and wherein said APIs enable substantial reduction of IO DMA address fragmentation and reduces latency of DMA address mapping requiring contiguous IO DMA address space.

* * * * *